United States Patent [19]
Farrell, Jr. et al.

[11] 3,920,550

[45] *Nov. 18, 1975

[54] PROCESS AND EQUIPMENT FOR AUTOMATIC CHEMICAL-BIOLOGICAL WASTEWATER TREATMENT WITH PROVISIONS FOR RECYCLE AND REUSE

[75] Inventors: R. Paul Farrell, Jr.; James L. Setser, both of Schenectady, N.Y.

[73] Assignee: Environment/One Corporation, Schenectady, N.Y.

[ * ] Notice: The portion of the term of this patent subsequent to Oct. 29, 1991, has been disclaimed.

[22] Filed: Sept. 21, 1972

[21] Appl. No.: 290,809

[52] U.S. Cl. .................... 210/86; 210/96; 210/104; 210/195; 210/199; 261/64 R
[51] Int. Cl.² ........................................ B01D 35/00
[58] Field of Search ............. 210/96, 102, 103, 104, 210/194–197, 199, 201, 248, 257, 205, 86; 261/64 R; 4/10

[56] References Cited
UNITED STATES PATENTS

| | | | |
|---|---|---|---|
| 2,502,349 | 3/1950 | Sebald | 210/194 X |
| 2,527,659 | 10/1950 | Smith | 261/64 R X |
| 2,987,185 | 6/1961 | Feeney | 210/97 |
| 3,121,680 | 2/1964 | Ciabattari | 210/205 X |
| 3,327,855 | 6/1967 | Watson et al. | 210/152 X |
| 3,342,727 | 9/1967 | Bringle | 210/96 X |
| 3,482,695 | 12/1969 | Hansen et al. | 210/104 X |
| 3,557,954 | 1/1971 | Welch | 210/96 X |
| 3,642,617 | 2/1972 | Brink et al. | 210/205 X |
| 3,721,344 | 3/1973 | Rost | 210/104 |
| 3,844,946 | 10/1974 | Farrell, Jr. | 210/104 |

Primary Examiner—Samih N. Zaharna
Assistant Examiner—Robert G. Mukai
Attorney, Agent, or Firm—Charles W. Helzer; Gilbert L. Wells

[57] ABSTRACT

A wastewater disposal system, wherein, wastewater from producing sources is deposited in a holding tank after passing through a grinding device until a predetermined level has been reached, at which time a pump will remove the waste from the holding tank and discharge it into the aerobic treatment and settling tank where it will be aerated, and separated by settling to effluent and sludge. The sludge is removed from the treatment and settling tank thereafter for further treatment and settling so that liquid may be removed from the sludge for return ultimately to the treatment and settling tank or holding tank. The settled effluent may be removed and fed into a storage tank. Various pressure and level sensing controls are used in conjunction with a coordinating and timing control unit to control the sequence of operations for efficiency. An emergency fuel driven prime mover-generator may automatically supply electric power in emergencies. Sensors determine system failure and control an automatic telephone dialing warning system. Overflow from various tanks is fed to an overflow tank, with provision for distribution of back-up fluid. The aeration in the tanks is controlled by: modulating and/or controlling on/off of air delivery according to the dissolved oxygen content within the appropriate tank; and feed air pressure may be controlled according to sensed liquid head within the appropriate tank. With the exception of the tanks and some tank connecting lines, the entire system may be mounted on skids as a module that may be factory assembled and calibrated. Prior to settling, concentrated flocculant may be added by a flow through mixer with delayed shut-off of mixing liquid to flush the mixer and downstream lines of corrosive diluted flocculant.

7 Claims, 3 Drawing Figures

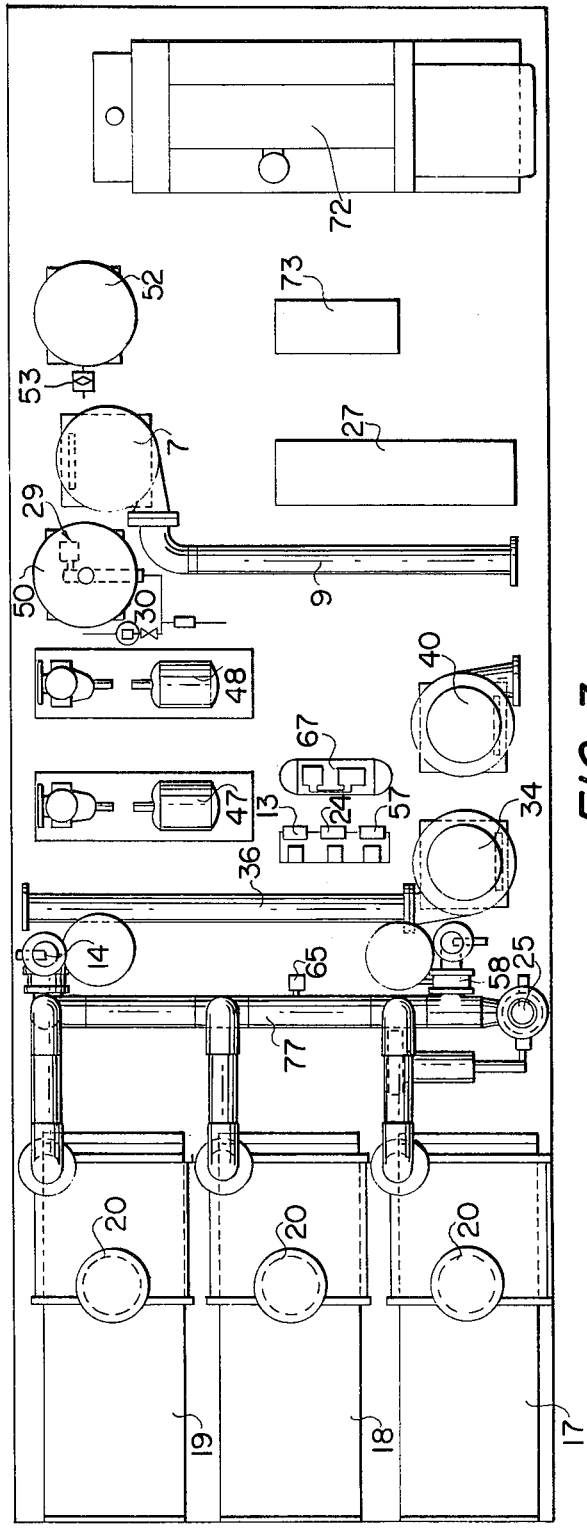

PROCESS AND EQUIPMENT FOR AUTOMATIC CHEMICAL-BIOLOGICAL WASTEWATER TREATMENT WITH PROVISIONS FOR RECYCLE AND REUSE

BACKGROUND OF THE INVENTION

The present invention is related to the assignee's copending application Ser. No. 18,682, filed Mar. 11, 1970, now abandoned, for "Aerobic Wastewater Treatment System With Provision for Partial Reuse and Infrequent Dosing to Soil", the disclosure of which is incorporated herein in its entirety.

Numerous systems have been proposed for treating waste from dwelling units which might include, but are not necessarily limited to individual homes, apartment buildings, motels, subdivisions, commercial and light industrial buildings, recreational areas, marinas, highway service areas and rest stops and the like. From this listing it will be appreciated that many of these classes of occupancy are remote from public utilities such as water supplies and sewers. Consequently, they rely on septic tanks and drain fields which generally have limited capacity due to the size of the drain field or the nature of the drain soil, or the use of flow through "package plants" which discharge to receiving bodies of water. To overcome the limited capacity problem, recycling of effluent for flushing purposes is known; however, there is a considerable need to upgrade the quality of the recycled effluent. Discharge to receiving streams is becoming increasingly difficult because of tightening government standards governing the quality of discharged effluents. Further, many prior systems have required constant running resulting at times in unwanted suspension of particles which passed out of the plant with the effluent stream.

In general, the prior art systems have been subject to hydraulic disturbance, poor performance under low organic loading and have not therefore been able to consistently and efficiently satisfy the environmental and/or aesthetic demands of usage.

SUMMARY OF THE INVENTION

It is an object of the present invention to provide an efficient waste disposal system that will retain a minimum amount of sludge, discharge a high quality effluent consistently which can be reused in various ways or recycled for flushing purposes, and operate trouble-free without undue complexity, power loss and initial cost.

The waste first flows through a grinding mechanism such as a comminutor or grinder pump and is then deposited in a holding tank where it accumulates to a predetermined quantity, at which time a pump unit is actuated to transfer the waste to a treatment tank. Thus, the pump unit operates only infrequently for efficiency; however its operation is predictable to the extent that other operations requiring periods of quiescence can be conducted without interference.

The aerobic treatment and settling tank has means that pumps air through the waste material therein to enhance the aerobic action of the microorganisms present for decomposing the waste material, and to flocculate the waste material. Alternatively, or in addition, an agitator may be employed if necessary. When a predetermined quantity of waste material is present within the treatment and settling tank, the automatic controls will be actuated to first feed and mix a flocculating chemical and then provide an absolutely quiescent period wherein additional raw waste will not be discharged from the holding tank, air will not enter the treatment and settling tank and the agitator, if present, will be inoperative.

After this absolutely quiescent settling period, most of the clarified supernatant will be pumped out of the treatment and settling tank into an effluent storage vessel. Thereafter, a pump will remove the buffer layer and any excess sludge above a predetermined fixed level to a sludge treatment tank.

After the removed sludge is treated by microorganisms and/or merely further separated by quiescence, the supernatant from the sludge treatment tank will be returned to either the holding tank or the treatment and settling tank. In this manner, a minimum amount of sludge will be retained, and a liquid balance will be maintained.

The effluent storage tank or vessel receives the effluent from the treatment and settling tank. This stored volume may be used to supply a recycle demand system and dose the drain field; or it may be pumped to an irrigation system, a ground water recharge system, a suitable receiving stream, etc. The disposal of the effluent may be automatically controlled or manually actuated.

Chemicals may be added to the effluent by the eductor for regulating its odor, color and microorganism content, or alternatively, the chemicals may be added at the effluent storage tank.

Suitable controls are provided for the automatic and maintenance-free operation of the system. The system is controlled so that a relatively short period of complete quiescence following introduction of the flocculant, is not interrupted by the intake of additional waste, admission of air, or operation of the agitator, for example, which might otherwise disturb the ideal settling process which is aided by the flocculant.

BRIEF DESCRIPTION OF THE DRAWING

Further objects, features and advantages of the present invention will become more clear from the following detailed description of the drawings, wherein:

FIGS. 2 and 3 show one possible layout of the necessary mechanical and electrical equipment on a skid type package as an illustrative embodiment of the present invention.

DETAILED DESCRIPTION OF THE DRAWING

Figure 1:
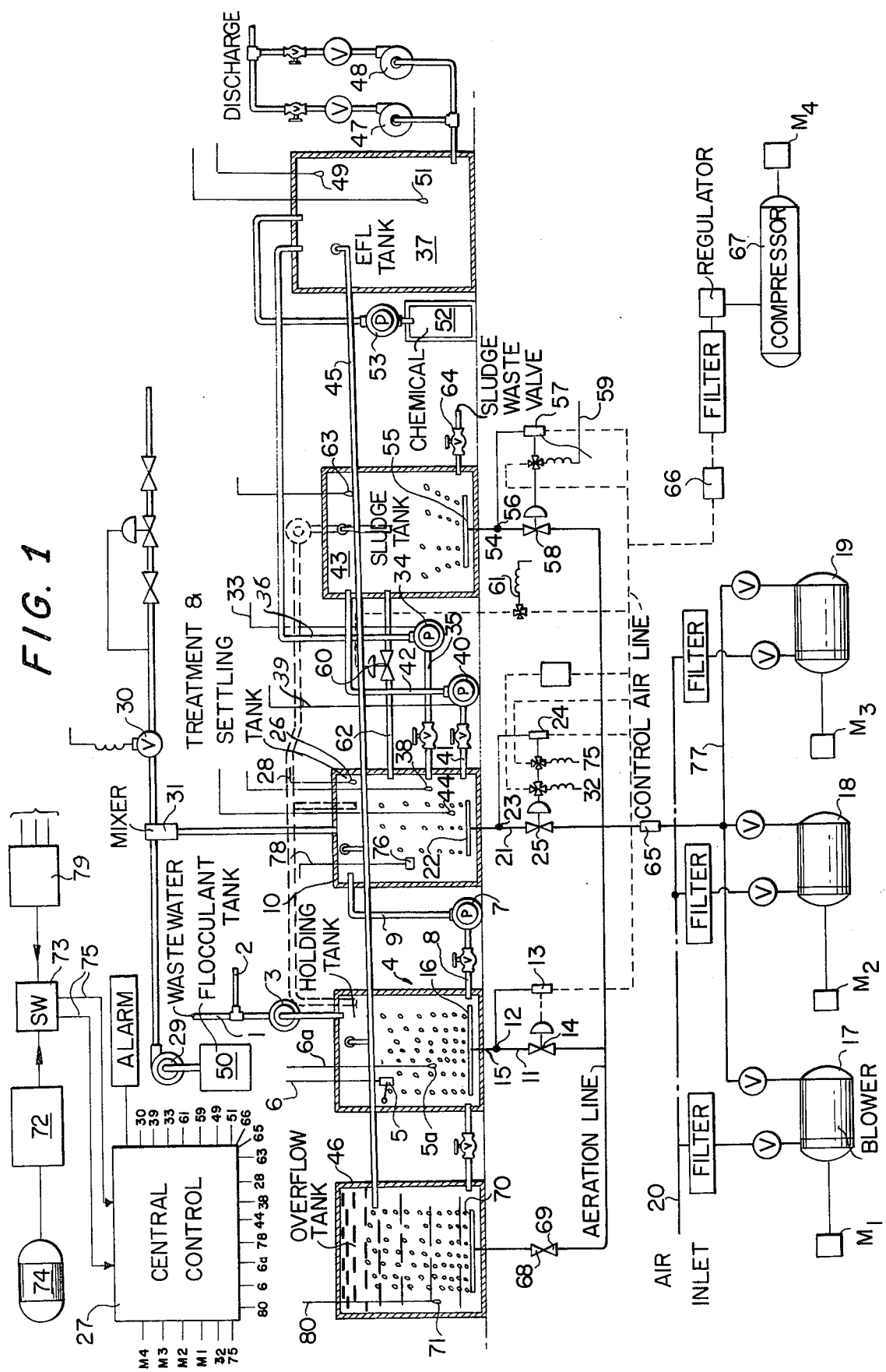
FIG. 1 is a schematic representation of the wastewater disposal system of the present invention showing the various tanks and other components in circuit with the fluid and electrical control circuits.

The present invention is intended for use with (but is not necessarily limited to) groups of individual houses, apartment buildings, motels, subdivisions, commercial buildings, light industrial buildings, recreational areas, marinas, highway service areas, bus stops and the like. As may be appreciated, many of these classes of occupancy or usage are remote from public utilities such as water supplies and sewers.

One of the objects of the present invention is to use the existing underground absorption capability of soils in a manner which will increase their contribution as adjuncts to a total sewage disposal system by approximately 400% or more. This improved soil performance can be put to extremely practical use in any one of the following manners:

1. With the present system, it may be practical to use soils for absorption that would otherwise be unsuitable.
2. The present ststem may require a soil absorption area that is considerably smaller than would otherwise be required with conventional systems, which will substantially reduce drain field installation cost and remove many limitations as to adjacent soil usage.
3. The present invention will increase the life expectancy of a soil absorption system by "wetting" the soil at a much reduced rate.

Further, the present system produces a very high quality effluent that will be aesthetically and practically accceptable for many purposes either before or after inexpensive and relatively simple chemical polishing steps. Thus, the system will produce a liquid suitable for use as a flushing liquid in water closets of the buildings served, alternatively, the liquid could be used for irrigation purposes, ground water recharge, flushing of sewer lines, firefighting water, or discharge to receiving waters with little if any degradation thereof.

Since the water recirculated for flushing purposes and the like would typically constitute somewhere between 30% and 80% of the total water usage, there will be a corresponding savings realized in true water consumption from a potable water supply and a corresponding reduction in the volume of effluent applied to the soil absorption system, or otherwise discharged, when a recirculation system is applied.

Further, since a portion of the liquid can be recirculated and the recirculating water will constantly be supplemented by fresh relatively clean wastewater from tubs, sinks, showers and the like there will be no serious accumulation of hazardous, offensive, or unhealthy constituents in the flushing liquid. Such latter problems have been experienced to an unacceptable degree in earlier recirculating toilets and the like which had no provision for this significant and continual fresh make-up water feed.

Two preferred embodiments of the present invention are schematically shown in the attached drawing. Specific details are shown for purposes of illustration, without any intent to be solely limited thereto.

In the embodiment of FIG. 1, normal building wastewater enters through the waste fluid pipe 1 and combines with the side stream waste fluid pipe 2 for discharging the combined waste fluid through a grinding mechanism 3 or grinder-pump into a holding tank 4. The waste fluid within the side stream pipe 2 will be obtained from conventional toilets and urinals (not shown) or alternatively may be recycled wastewater flow, while the waste fluid in pipe 1 is received from all other sources (not shown) within the building, for example, sinks, showers and the like. Pipe 1 and pipe 2 could also represent any combining wastewater streams in the system when recycling is not planned.

Thus, the waste fluid enters the holding tank 4 as generated in small batches and intermittent flows depending upon the activity patterns within the building. After the holding tank 4 has received a predetermined volume of waste fluid, the float operated switch 5 will send a signal through line 6 to actuate a motor driven pump 7 for withdrawing the waste fluid from outlet pipe 8 at the bottom of tank 4, and pumping the fluid through discharge pipe 9 into a microorganism treatment and settling tank 10. Other conventional types of level sensing devices may be employed instead of the per se conventional float operated switch 5. The switch 5 or another similar switch (5A) having output wire 6A will stop the pump when a lower predetermined level is sensed.

The holding tank is kept mixed by a constant flow of air through air pipe 11 which is controlled by primary flow element 12 operating a transmitter/controller 13 which controls flow valve 14. The air enters the tank through line 15 and is diffused through air diffuser(s) 16.

The treatment and settling tank 10 is initially seeded with microorganisms for treatment of the waste fluid, particularly for aerobic treatment. With aerobic treatment, a suitable pump means, for example centrifugal blowers 17, 18 and 19 are actuated to pump an oxygen containing fluid such as air from an oxygen fluid source 20 and filters, through an aeration line to pipe 21 for discharge adjacent the bottom of the treatment tank 10 through diffuser 22 to bubble upwardly through the waste fluid within the tank 10, in a known manner. The flow of air into the diffuser 22 is controlled by a primary flow element 23, a transmitter/controller 24, and a control valve 25 to maintain aerobic conditions conductive to a high degree of stabilization of the organic content of the wastewater within the tank 10. With the initial seeding, the tank 10 will contain a controlled amount of activated sludge, for both absorption and biological stabilization. In addition, the upward passage of the air from conduit 21 and diffuser 22 through the wastewater will produce a thorough continuous mixing of the wastewater within the treatment tank 10, which is essential during microorganism treatment.

The aerobic treatment and mixing within the treatment and settling tank 10 will continue as long as required to fill the tank 10 to its operating level near the top, as determined by the level sensing device float operated switch 26. For peak conditions, the treatment and settling tank 10 will fill once in 4 hours. When the treatment and settling tank 10 does become full as determined by the level sensor 26, a signal is sent to a central cycling and control mechanism 27 through electric line 28 to begin a cycle of flocculation, sedimentation, effluent draw-off, and removal of excess sludge (if any), in the order named. This entire cycle of operation will be initiated first by the introduction of a suitable flocculating chemical from a source 50 into the treatment and settling tanks 10. The flocculating chemical preferably comprises a synthetic, water soluble, high molecular weight, cationic organic polymer such as Dow "Purifloc" C-31 manufactured and sold by the Dow Chemical Company; Rohm and Haas "Primaffloc" C-3 manufactured and sold by the Rohm and Haas Company, or Dearbon "Aquafloc" manufactured and sold by the Dearbon Chemical Company. This compound can be pumped by a metering pump 29 and mixed with water obtained through an automatic shut-off valve 30. The mixing is accomplished by an inline mixer 31.

When the level sensing device 26 senses the attainment of the predetermined level within the treatment and settling tank 10, a signal is developed by the level sensor 26 and supplied through electrical line 28 to the control device 27 where it initiates operation of the central control mechanism. It will be appreciated that after the preceding operation of the feed pump unit, the level of waste fluid within the treatment and settling tank 10 will be at some point below the level required to initiate operation of the central controller 27 by level sensor 26. At some point during the next successive operation of the pump 7 (and last operation to cycling the system through a cycle of flocculation, sedimentation; draw-off, etc), the required level in tank 10 will be attained. This may occur early in the last operation of the pump or later. To accommodate such variations, provision can be made to allow the pump 7 to complete its pump down of holding tank 4. This is accomplished by including in the central control mechanism 27 an appropriate delay for inhibiting initiation of the introduction of flocculant from source 50 into the treatment and settling tank 10, until such time that the pump 7 completes its last operation. Alternatively, pump 7 could be inhibited from further operation once the level sensor 26 has been triggered, or the further pumping operation could be conducted concurrently with introduction of the flocculant from source 50 and subsequent mixing for a period of time to accommodate complete pump-out of the holding tank 4. It is preferred, however, to inhibit start of the flocculation, sedimentation, etc. cycle since this will allow the holding tank 4 to be completely emptied prior to the start of such cycle. In this manner, tank 4 can be of minimum size, but will be conditioned to receive and temporarily store all new waste discharge during the cycle. To assure that pump unit 7 does not operate to discharge new waste fluid into treatment and settling tank 10 during the flocculation, etc. cycle, the central control 27 operates to positively inhibit the pump 7 unit during this period despite the condition of the level sensor (float operated switch 5). This inhibit condition is maintained during the complete flocculation, sedimentation, effluent draw-off, etc. cycle to be described hereinafter, and then is removed to return the pump 7 unit to its normal condition under the control of the float operated switch 5. Thus, the control mechanism 27 through its inhibiting action, and the emptying of the holding tank 4 at the beginning of the cycling, prevents discharge of new waste material from the holding tank 4 into the tank 10 for a period of time sufficient to complete the cycling within the tank 10.

Upon completion of the last operation of pump 7 after triggering the float operated switch 26, the central control mechanism will actuate a metering pump 29 and solenoid operated shutoff valve 30 for admitting a measured quantity of flocculant solution from source 50 into tank 10 through mixer 31. This measured quantity will be in proportion to the size of the tank 10. Thereafter the aerator 22 will continue to bubble air up through the tank 10 for a period to assure thorough mixing of the flocculant. This mixing period may last for two or three minutes, or the like dependent upon the size of the tank 10, manner of introduction of the flocculant, etc.

After thorough mixing of the flocculant into the waste material, the control mechanism 27 prevents further aeration by closing the control valve 25 using pneumatic or electrical signal 32 (dependent on mode of control valve) to provide a predetermined quiescent period for sedimentation to form a sludge layer at the bottom of tank 10 and a high quality supernatant at the top of tank 10. After this completely quiescent period the control mechanism 27 will initiate a supernatant draw-off period by sending a signal through electric line 33 for actuating the pump 34 to remove the high quality effluent from the tank 10 through outlet pipe 35 for discharge by pipe 36 into an effluent storage vessel 37. The outlet pipe 35 is preferably placed at an appropriate level with respect to the tank 10 and the pump 34 actuated for a sufficient time so that liquid is drawn off from the level of actuating the level sensor 26 down to the level of the outlet pipe 35, or an additional level sensor 38 may be provided below the level sensor 26 for deactuating the pump 34 at an appropriate level.

Thereafter, the control mechanism 27 sends a signal through electric line 39 to a sludge pump 40 to withdraw sludge through tank outlet 41 in the bottom of tank 10 for passing the sludge through discharge pipe 42 into a sludge stabilizing or digester tank 43. The outlet pipe 41 is placed at an appropriate level with respect to the tank 10 and pump 40 actuated for a sufficient time so that liquid is drawn off from the effluent cutoff level to the level of outlet 41 or an additional level sensor 44 may be provided for deactuating the sludge pump. Should not excess sludge be present clear liquid is pumped to sludge tank 43. In this manner, a preset maximum volume of activated sludge is maintained in tank 10, but sufficient to activate or aerobically treat later incoming new wastewater.

Thereafter, the control mechanism 27 will return the system to the previously described operation wherein wastewater from holding tank 4 is periodically, as controlled by level sensor 5, discharged into tank 10 and air from source 20 and blower 17, 18 and/or 19 is bubbled continuously through the new incoming wastewater and retained activated sludge to thoroughly mix the two and aerobically treat the new wastewater. This condition is maintained until level sensor 26 again actuates the control mechanism 27 to run through the previously described cycling.

As described above, a batch of high quality effluent or supernatant is cycled and transferred from the treatment and settling tank 10 by means of pump 34 into the effluent storage vessel or tank 37 in one continuous cycling and transfer operation that takes place in a relatively short period of time, for example 45 minutes or less. At the beginning of the effluent or supernatant draw-off phase, the effluent storage tank 37 will be only partially full, it previously having served as a source of flushing water for the various toilets and urinals within the building, or as a source of irrigation water or the like, during the preceding period while the treatment and settling tank 10 was being filled.

Preferably, the maximum level within the effluent storage tank 37 is determined by the overflow pipe 45, which leads to an overflow tank 46 or soil absorption system (not shown) in the case of a dosing-recycling end use system.

The effluent is removed from the effluent storage tank 37 by effluent return pumps 47 and 48 (only one may be used if desired) to its point of end use (such as an irrigation head) or its point of disposal (such as discharge to a receiving stream). These pumps can be automatically started by use of a high level sensor 49 and stopped by a low level sensor 51 connected to entral control panel 27.

Although the quality of the liquid removed from the effluent storage tank 37 by the pumps 47 and 48 is high enough to be entirely safe for many applications and functional as reusable or disposable water without further treatment, further treatment may be provided if desired as follows. To ensure that the effluent is aesthetically acceptable, it may be polished by adding one or more treatment chemicals which can include a coloring agent, odorant, disinfectant and antifoaming agent. One or more of these chemicals, which are known per se and will not be described in detail, may be added into the effluent by means of a metering pump 53 which is connected in parallel operation with pump 34. The chemicals are maintained within storage tank 52 where they are added to effluent storage tank 37 as pump 34 delivers a batch of effluent to the tank, under the control of panel 27 or a flow sensor in line 36.

Sludge removed from the treatment and settling tank 10 is further treated and separated for removal of the liquid phase therefrom to again pass through the treatment system. Sludge through pipes 41 and 42 is received within the sludge tank 43 for further digesting treatment or the like. It is contemplated that air may be delivered to the tank 43 continuously or not from a separate source or pumps 17, 18 and/or 19 for aerobic sludge digestion. The air is delivered through line 54 and diffuser 55. The quantity of air is controlled by primary flow element 56, transmitter/controller 57, and control valve 58.

Means are provided for removing the supernatant liquid from the sludge treatment tank 43 and returning it to the holding tank 4, although a non-preferred form could return the effluent from the sludge tank 43 directly to the treatment and settling tank 10. Following the addition of the excess sludge to the sludge tank 43 by pump 40, the air to the sludge digester is stopped by sending an electrical signal from central control 27 through wire 59 closing solenoid valve 58. This allows for a predetermined quiescent period in sludge tank 43. After adequate settling, a quantity of supernatant equal to the volume of excess sludge pumped into the tank is drained through an air-pressure controlled valve 60 or pumped by a drainback pump to the treatment tank 10 or holding tank 4. This is actuated on a time basis by central control 27 using a signal through line 61 to control the actuating air pressure fed to valve 60. The deactuation of this valve is determined by the level of the discharge line 62 or by a cutoff level sensor 63. Following this drainback operation the air valve 58 is reopened allowing air to reenter diffuser 55. The solids in sludge tank 43 are further digested by aerobic action of bacteria contained in the sludge. This digestion converts organic material to $CO_2$, water, other harmless substances and undigestable solids which accumulate in tank 43 until they must be pumped out. Such pump out is accomplished through waste valve 64 at infrequent intervals.

The air system, which consists of three centrifugal blowers (positive displacement blowers may be substituted where noise is not a problem and the described control mechanism would be simplified) 17, 18, 19, supplies air to the holding tank 4, the treatment and settling tank 10, the sludge tank 43, and the overflow tank 46 (when manually actuated via shutoff valve 69) for both stirring and oxygen requirements of aerobic treatment. The three blower system is proposed to operate with two blowers running and the third as a spare. The air flow to the holding tank 4, treatment tank 10, and sludge tank 43 is controlled in each case by a primary flow element 12, 23, 56 that feeds a $\Delta P$ signal to a $\Delta P$ transmitter 13, 24, 57, which signals a controller which controls the valve 14, 25, 58 respectively. This control system is necessary in each of the named air feed lines to control the operation the parallel blowers which are feeding the supply manifold 77. Such a control system is necessary due to the on-off cycles in the treatment and sludge tank and the variable heads present in the tanks. Since a centrifugal blower's output changes with changing pressure heads, strict control is necessary to maintain suitable air delivery. The controllers change the air pressure delivered to the diffusers according to the receiving liquid head encountered.

The air feed to the treatment and settling tank is further modulated and periodically stopped according to the dissolved oxygen content of the processing liquid between settling periods. A dissolved oxygen (D.O) probe 76 is installed in the treatment tank 10, to control the decrease and shutoff of the air flow to tank 10 based on D.O. content. If the dissolved oxygen content exceeds a predetermined value the D.O. signal to the control console 27 via line 78 will cause a synthetic or generated control signal to go to the control valve 25 via line 75. This will completely or partially close the valve, depending on the signal decreasing or shutting off the air supplied and thus eventually decreasing the D.O. When the D.O. drops to another preset point, normal air control will be restored. If the oxygen content is raised too high, the beneficial microorganisms may be destroyed, as well as the system being inefficient by supplying too much air. The air supplied by the diffuser to tank 10 must be sufficient for efficient biological conversion with a full tank and maximum filling rate, which is greatly different in oxygen demand than a pumped down tank that will not receive new wastewater for a long period of time. Thus the system may be designed to efficiently meet the maximum oxygen demand and be shut down by the D.O. sensor during minimum demand. With shutdown of air fed to tank 10 with low or no addition of new matter, the D.O. will eventually decrease to a point where the activated sludge will become anaerobic (or septic); before this happens, the D.O. sensors will respond to a predetermined low value and reactivate the supply of air to the diffuser 22 for a short period of time, after which air supply will again be stopped when the high value is reached. Similar D.O. controls are provided for all of the air diffusers, if desired.

The treatment system is supplied with alarms which signify abnormal operation. All main tanks overflow into the overflow tank 46 which will alarm via sensor 71 and line 80. In case of an overflow the manual valve 69 should be opened supplying air through line 68 and diffuser 70 so that the overflowed material will remain aerobic. Main air loss is indicated by sensor 65 and control air loss by sensor 66 (if pneumatic control valves are used). And in addition many other variables in the system could be set up to alarm. These alarms can be indicating lights, horns, or a Tel-Guard alert (a product of Benedict Productions, Inc., Schenectady, N.Y.). The Tel-Guard system 79 picks up alarm signals and automatically calls, via a telephone line, responsible parties. The Tel-Guard system recites a prepared tape when activated.

The subject treatment system is also equipped with an appropriate standby power source of electrical energy in case of temporary shortages in the main power line 79. This generator unit 72 is powered by propane 74 or other suitable fuels and automatically starts and switches over by an emergency transfer switch 73 to assure continuous availability of sufficient electric power in bus 75.

The above described equipment pertinent to the present invention can be mounted on a single equipment skid. Such a skid could contain all critical components of the system and could be used as the operation center for a system of tanks. The type of tanks and actual location with respect to the various components may be varied. Such a skid type arrangement is shown in FIGS. 2 and 3. The numbers shown in FIGS. 2 and 3 correspond to the same components in FIG. 1 of this disclosure.

As shown in FIGS. 2 and 3, a skid or integral base is provided with all the supply and control elements that have been schematically shown in FIG. 1, and with much of the piping necessary, although not all of such components are shown in FIGS. 2 and 3. That is, the module of FIGS. 2 and 3 contains all the elements necessary for the system of the present invention except for the overflow tank, the holding tank, the treatment and settling tank, the sludge tank and the effluent tank, as well as some piping or coupling as necessary for connecting such tanks to the control module. Since these tanks are quite heavy and bulky, they are delivered separately to the system use site. However, the modules of FIGS. 2 and 3 are pre-assembled and are substantially completely calibrated at a factory prior to delivery to the system site. This is particularly important with respect to the present invention where various sophisticated controls are used for the system, including the tank liquid head control of aeration, and dissolved oxygen content control of aeration.

Actuating power for the various valves and the other mechanisms described previously may be provided by conventional solenoids, as indicated in respect to some of the elements or may be provided by compressed air as indicated as in respect to others of the elements. Thus, either may be used exclusively or a hybrid system employed as disclosed. The indicator to control the air line receives its air under pressure from the motor driven compressor 67 that will supply air regulated to desired pressure and filtered through a sensor 66. Alternately, the control air supply may be tapped from the aeration line that is supplied by blowers 17, 18, 19, so that the thus tapped air may be filtered, regulated and provided with a sensor such as 66 before being fed to the various air powered controls.

SUMMARY AND OPERATION

Wastewater to be treated by the present system enters the holding tank 4 through lines 1 and 2 and is aerated by oxygen containing gas bubbled through it from the diffuser 16 until the wastewater liquid level reaches a pre-determined height, at which time the level control 5 will actuate the pump 7 to transfer the wastewater substantially completely from tank 4 to the treatment and settling tank, through lines 8 and 9. The treatment and settling tank contains activated sludge from a previous process, and combines the incoming wastewater from the holding tank with the activated sludge to aerobically treat the combination. This treatment is enhanced by aeration from diffuser 22, which also mixes the sludge with the incoming wastewater.

Aerobic digestion continues until sufficient wastewater has entered the treatment and settling tanks to reach a pre-determined level for actuation of a control cycle under the control of the central control 27. Preferably, holding tank 4 is pumped down to transfer all of its contents to the much larger treatment and settling tank. Thereafter, the central control 27, will discontinue aeration in the treatment and settling tank and prevent further discharge of wastewater from the holding tank into the treatment and settling tank, during a quiescent settling period. During the last pump down of holding tank 4 or immediately thereafter, a flocculant is preferably provided to assist in separation of effluent and sludge during the quiescent period.

Thus preferably, the concentrated flocculant from tank 50 is pumped simultaneously with a liquid, such as water, from valve 30 to where the concentrated flocculant and the liquid are mixed as they flow through an inline mixer 31, which is connected directly to the treatment and settling tank. Preferably, the control 27 will first shut off the supply of concentrated flocculant and continue the supply of liquid through the mixer 31 for a time sufficient to flush the mixer and line leading to the treatment and settling tank of diluted flocculant, since diluted flocculant is generally quite corrosive. As a preferred example the inline mixer may take the form of a jet pump, with either fluid acting as the motive fluid, and preferably the liquid being supplied under pressure so that it may sufficiently perform its flushing function after discontinuation of the concentrated flocculant feed.

Preferably, the aeration is continued for a short time after the addition of the flocculant, to thoroughly mix it before the beginning of the above mentioned quiescent period. The fluid and the sludge separate during the quiescent period, after which, preferably, according to a timer, the central control 27 will discharge the effluent down to the level of pipe 35 into the effluent storage tank 37, from which it will be withdrawn for various uses. Thereafter, the sludge and liquid extending between the levels of pipes 41 and 35 will be withdrawn automatically under the control 27 through line 41 and discharged into the sludge tank 43. Thereafter, the treatment and settling tank will resume its previously described function of receiving wastewater periodically from the holding tank and aerobically treating it, with the repetition of this cycle indefinitely.

The sludge within the sludge tank 43 is further aerobically treated with oxygen containing gas bubbling through it from the diffuser 55, until such time as the central control shuts off the supply of oxygen for a settling period, and thereafter actuates valve 60 to return separated supernatant from the sludge tank to the treatment and settling tank, or alternatively to the holding tank. It is thus seen, that the sludge tank will store the buildup of sludge over a very long period of time, until such time as sludge may be pumped out and disposed of through valve 64 during regular maintenance periods. Thus, the treatment and settling tank may be constructed, and have its various controls operated for a definite maximum level of activated sludge and a definite quantity range of effluent at various times in its cycle. In prior art tanks with unlimited sludge buildup there is the danger of sludge being pumped out with the effluent, or the sludge being pumped out entirely, or the sludge rising to such a level that the treatment and settling tank becomes inefficient or quite far out of calibration for its various controls.

Although each of the tanks has a liquid level control, if for any reason there is a malfunction such that liquid in a specified tank rises to a predetermined level, there is a provision according to the present invention for safety overflow, that is progressive so that backup into the wastewater source such as basement flooding will be prevented, as well as discharge of untreated wastewater from the system being prevented. More particularly, each of the treatment and settling tanks, sludge tank, and effluent tank has an overflow outlet at preferably a common level for discharging into a lower and inclined gravity feed overflow pipe 45 that will conduct the overflow to the discharge pipe within an overflow tank 46. Thus overflow from any one of the tanks will normally flow to the overflow tank. Also, the holding tank has an overflow to conduct wastewater above pre-determined level into the gravity flow line 45, which is lower, for ulitmate discharge to the overflow tank 46. Each overflow level for the holding tank, treatment and settling tank, sludge tank and effluent tank, is considerably higher than the pre-determined calibrated levels to actuate the aforementioned controls during normal operation, so that the overflows will be used only under emergency conditions.

Overflow wastewater within the overflow tank is sensed automatically to trigger an alarm, which may be audible, visible or telephoned to a central station, or the like. Further, the receipt of wastewater in the overflow tank may automatically actuate valve 69 to start aeration through diffuser 70 to keep the wastewater aerobic, although an attendant in response to the alarm may manually perform this function.

If the system breaks down to the extent that the overflow tank 46 becomes filled above the level of discharge from the gravity flow pipe 45 to cause backup within the pipe 45, this backup will first enter the holding tank assuming the holding tank is not already overflowing, since the overflow outlet for the holding tank as previously mentioned is lower than the overflow outlet for the treatment and settling tank, sludge tank, and effluent tank. If both the overflow tank and the holding tank become filled to the point where they each cause further backup within the gravity overflow pipe 45, further backup will be discharged into one of the treatment and settling tank, sludge tank, and effluent tank that has room. Thus, it is seen that the entire capacity of the system is used efficiently on overflow and emergencies upon general failure, so that such failure would be relatively harmless to the environment of the system either upstream or downstream. Although the various tanks have been schematically shown in FIG. 1, they will vary considerably in size, and will be of sufficient capacity that the system may continue to receive wastewater under failure overflow conditions for a long period of time, during which alarm signals will be sent out.

Aeration to at least the settling and treatment tank, and if desired, to each of the other tanks, may be controlled as follows. Since the liquid level within any one of the tanks varies, the liquid head or back pressure will correspondingly vary. According to the present invention, the air pressure supplied to the diffuser is varied in correspondence with sensed back pressure due to the liquid head so that optimum diffuser conditions will prevail. Liquid level or head is sensed as a back pressure in the air line leading to the diffuser. Preferably, the air pressure to the diffuser is increased with increasing liquid head in an automatic manner, and continuously over a wide range sufficient to accommodate all conditions. Pressure sensors may be a diaphragm controlling a pilot valve, as schematically shown.

Further, aeration to all of the tanks, or some of them may be controlled by the dissolved oxygen content of the liquid in the tank. Thus, aeration may be discontinued when the dissolved oxygen content reaches a maximum predetermined value to prevent destruction of the beneficial microorganisms or inefficient operation, and many further be continued when the dissolved oxygen content reaches a much lower predetermined minimum value preventing destruction of the microorganisms due to too little oxygen, so that the liquid will not become septic. Between the above-mentioned maximum and miminum values it is preferable to modulate the supply of air according to the dissolved oxygen content to automatically maintain an intermediate optimum dissolved oxygen content for maximum aerobic digestion.

It is thus seen that although there are specific advantages to the specifically described details of the several embodiments and variations of the present invention, many furher modifications, variations and embodiments are contemplated within the broader aspects as determined by the spirit and scope of the appended claims.

What is claimed is:

1. A wastewater treatment system to be connected between a wastewater inlet and a treated effluent outlet, comprising:

a wastewater holding tank with means for receiving wastewater directly from the inlet; a treatment and settling tank; level responsive means for transferring wastewater from said holding tank to said treatment and settling tank when the liquid in the holding tank reaches a predetermined level; means for supplying air to the wastewater within the treatment and settling tank to agitate and aerate it for aerobic treatment, and having means for providing a quiescent period to provide separation of effluent and activated sludge; an effluent storage tank with mans for receiving effluent from said treatment and settling tank and means for removing liquid from said effluent storage tank; a digester with means for receiving sludge from said treatment and settling tank; a separate overflow tank; gravity overflow means for conducting fluid to said overflow tank and having overflow inlets above a predetermined level in said treatment and settling tank, said digester and said effluent storage tank; said gravity overflow means further having an overflow inlet in said holding tank to conduct fluid above a predetermined level within said holding tank to said overflow tank; said overflow inlets in each of said treatment and settling tank, digester, and effluent storage tank being elevated above the overflow inlet of said wastewater holding tank said gravity overflow means further having an outlet in said overflow tank lower than each of said overflow inlets for conducting overflow from any of said treatment and settling tank, effluent storage tank, wastewater holding tank and digester first to said overflow tank until the liquid level within said gravity overflow means rises to the level of said wastewater holding tank overflow inlet, thereafter the overflow from said treatment and settling tank, digester and effluent storage tank will drain into said wastewater holding tank.

2. The system of claim 1 wherein said treatment and settling tank overflow inlet, said digester overflfow inlet, and said effluent storage tank overflow inlet are at substantially the same height so that overflow fluid backup from said overflow tank and wastewater holding tank will rise to the level of said treatment and settling tank, digester, and effluent tank inlets to thereafter flow into any one of said treatment and settling tank, digester, and effluent storage tank.

3. The system of claim 1, including means for selectively transferring fluid from said overflow tank to said holding tank down to a level considerably lower than the overflow tank outlet of said gravity overflow means, and including a level sensing alarm within said overflow tank for indicating a fluid level within said overflow tank above a predetermined level indicative of system failure.

4. The system of claim 3, wherein said alarm means includes means for automatically dialing a predetermined telephone number and transmitting a predetermined message.

5. The system of claim 1, including means for aerating material contained within said overflow tank.

6. The system of claim 5, including means for sensing the dissolved oxygen content within at least one of said tanks and controlling the aeration of at least said one tank in response to the sensed dissolved oxygen content.

7. The system of claim 1, including means for sensing the dissolved oxygen content within at least one of said tanks and controlling the aeration of at least said one tank in response to the sensed dissolved oxygen content.

* * * * *